(12) United States Patent
Ranta

(10) Patent No.: US 8,144,701 B2
(45) Date of Patent: Mar. 27, 2012

(54) METHOD AND DEVICE OF FRAME NUMBER ENCODING FOR SYNCHRONIZATION OF ELECTRONIC DEVICES

(75) Inventor: Jukka Ranta, Kaarina (FI)

(73) Assignee: Nokia Corporation, Espoo (FI)

( * ) Notice: Subject to any disclaimer, the term of this patent is extended or adjusted under 35 U.S.C. 154(b) by 968 days.

(21) Appl. No.: 11/794,504

(22) PCT Filed: Jan. 3, 2005

(86) PCT No.: PCT/IB2005/000001
§ 371 (c)(1),
(2), (4) Date: Jun. 2, 2008

(87) PCT Pub. No.: WO2006/072810
PCT Pub. Date: Jul. 13, 2006

(65) Prior Publication Data
US 2010/0034189 A1    Feb. 11, 2010

(51) Int. Cl.
*H04L 12/56*    (2006.01)
(52) U.S. Cl. .................. 370/389; 375/240; 709/247

(58) Field of Classification Search .................. None
See application file for complete search history.

(56) References Cited

U.S. PATENT DOCUMENTS

| | | | |
|---|---|---|---|
| 4,905,234 A | 2/1990 | Childress et al. | |
| 6,011,796 A | 1/2000 | Rezaiifar et al. | |
| 6,359,877 B1 * | 3/2002 | Rathonyi et al. | 370/349 |
| 6,507,582 B1 * | 1/2003 | Abrol | 370/394 |

FOREIGN PATENT DOCUMENTS

| | | |
|---|---|---|
| EP | 0496428 | 7/1992 |
| WO | WO 01/15344 | 3/2001 |

* cited by examiner

*Primary Examiner* — Brian Roberts
(74) *Attorney, Agent, or Firm* — Hollingsworth & Funk, LLC

(57) ABSTRACT

The present invention proposes a methodology implementable in form of a hardware or software module for coding and decoding a frame number. Firstly a method for encoding an original frame number for synchronization of communication between electronic devices resulting in an encoded compact frame number is provided. Additionally the corresponding decoding method is provided. Further devices and modules adapted to execute the steps of said methods are provided.

21 Claims, 8 Drawing Sheets

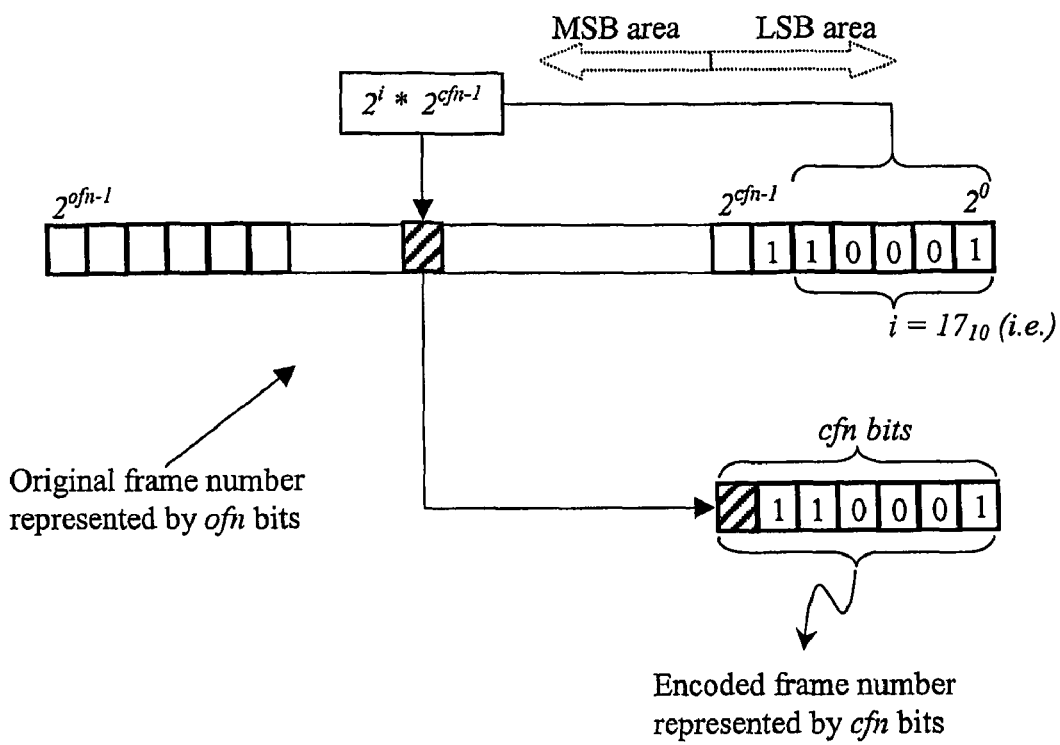
Fig. 1 (Encoding)

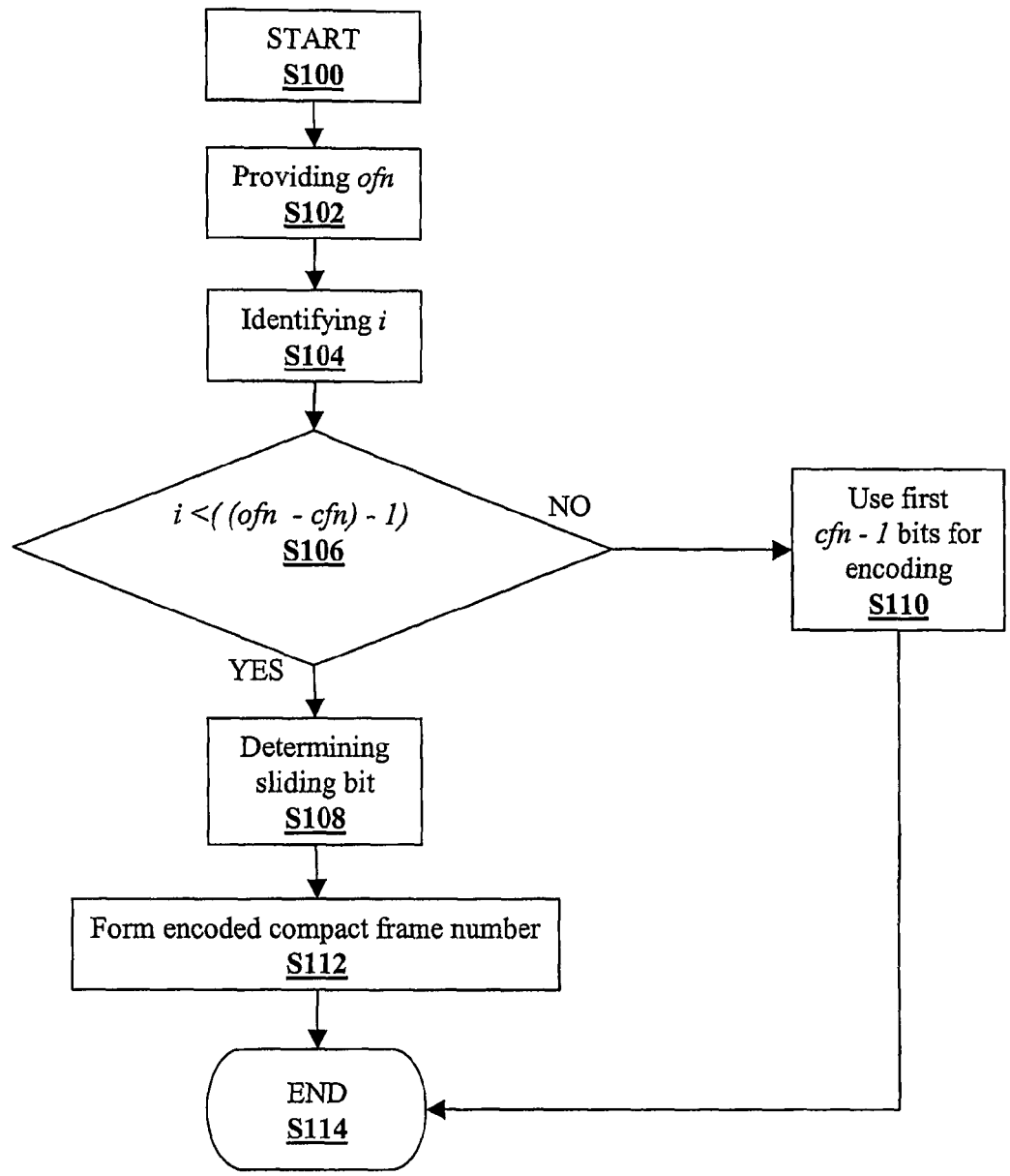
Fig. 2 (Encoding)

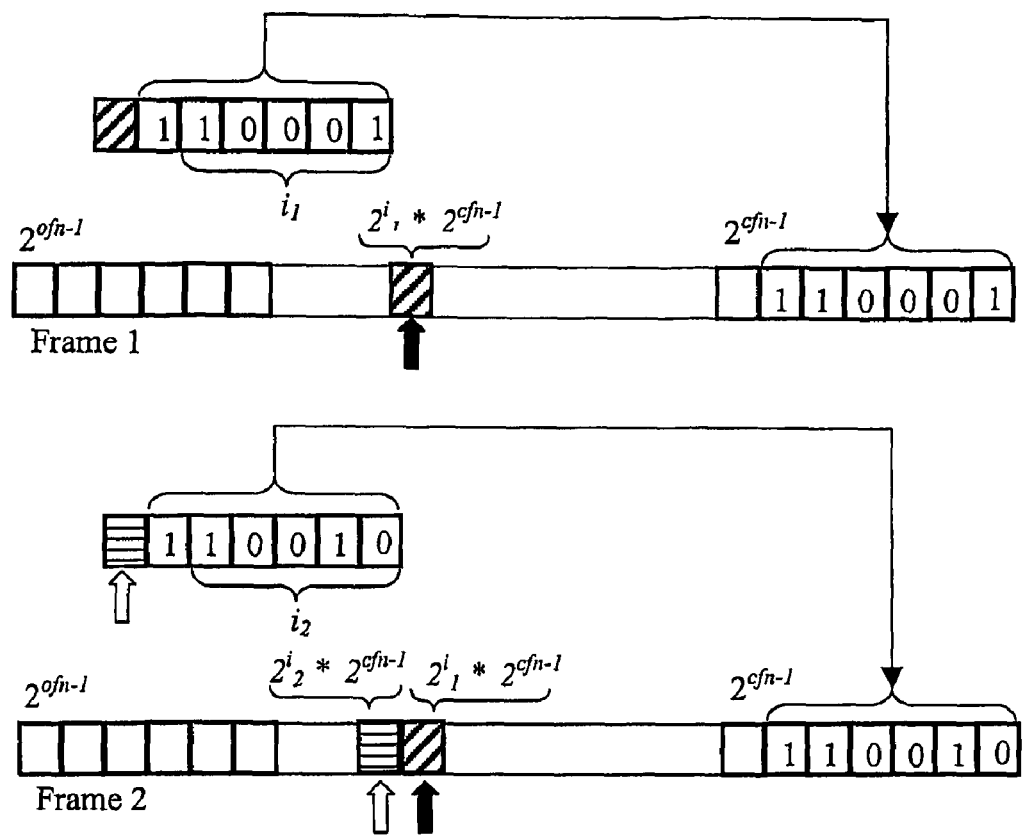
Fig. 3 (Decoding)

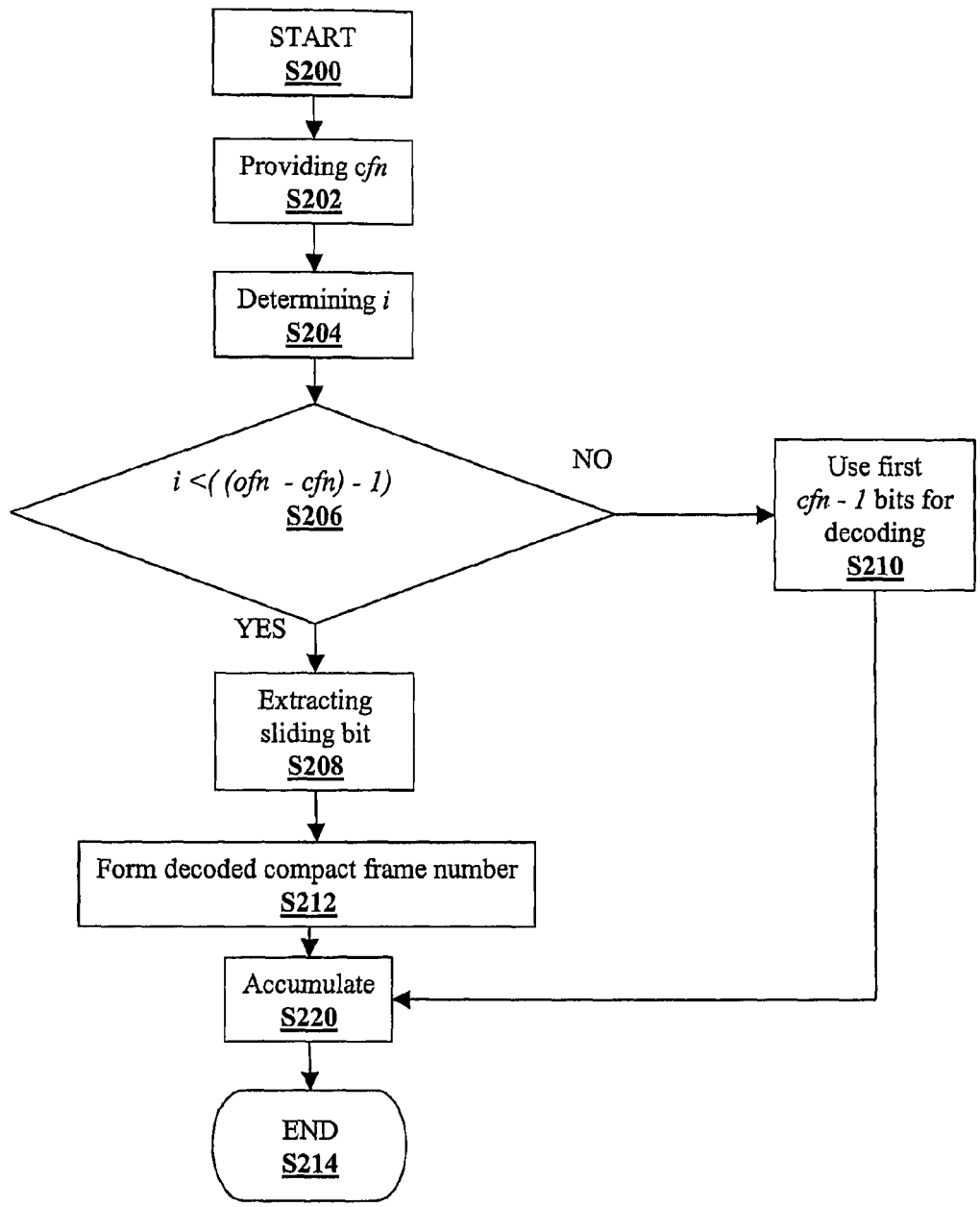
Fig. 4 (Decoding)

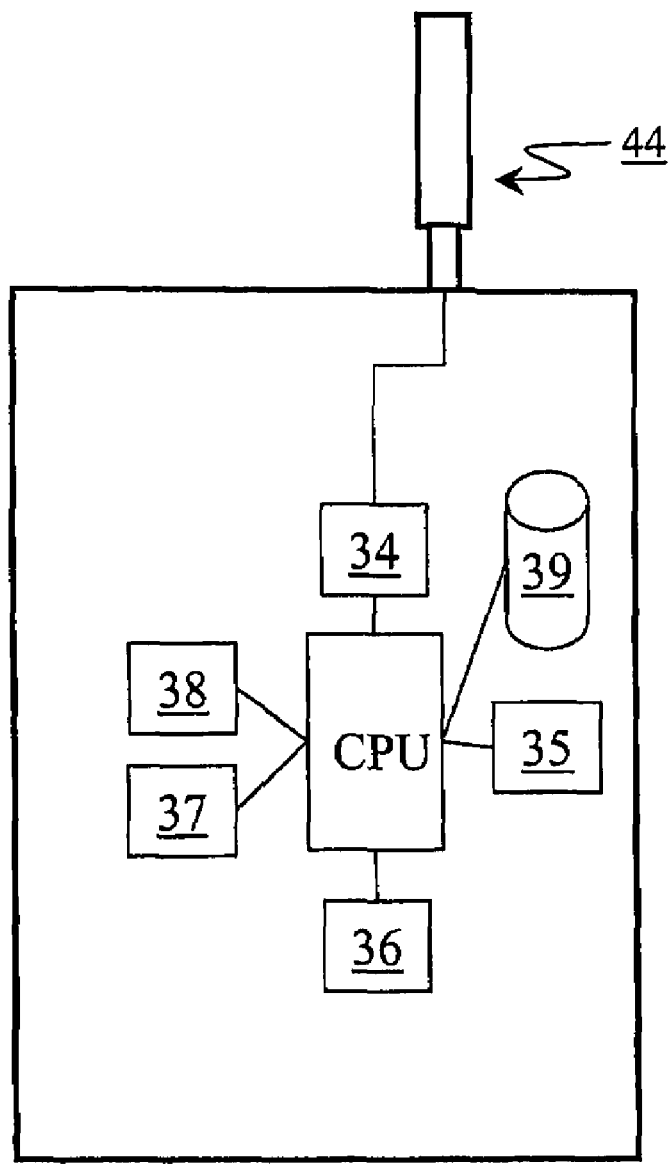
Fig. 5 (Encoding Device)

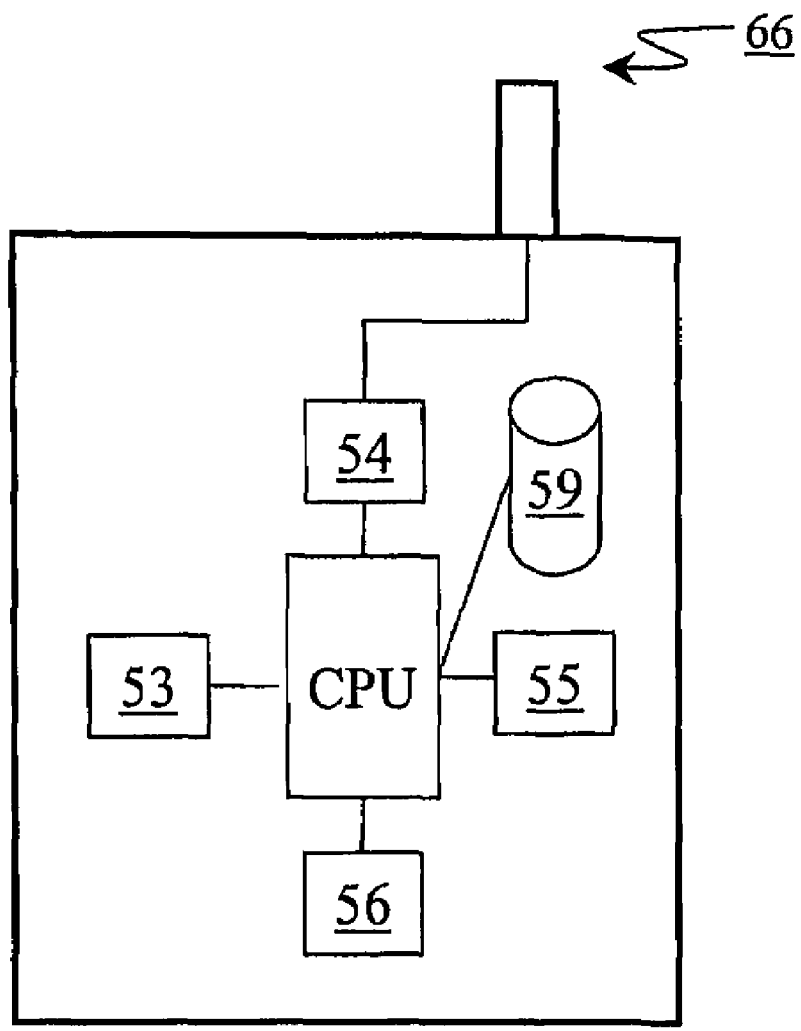
Fig. 6 (Decoding Device)

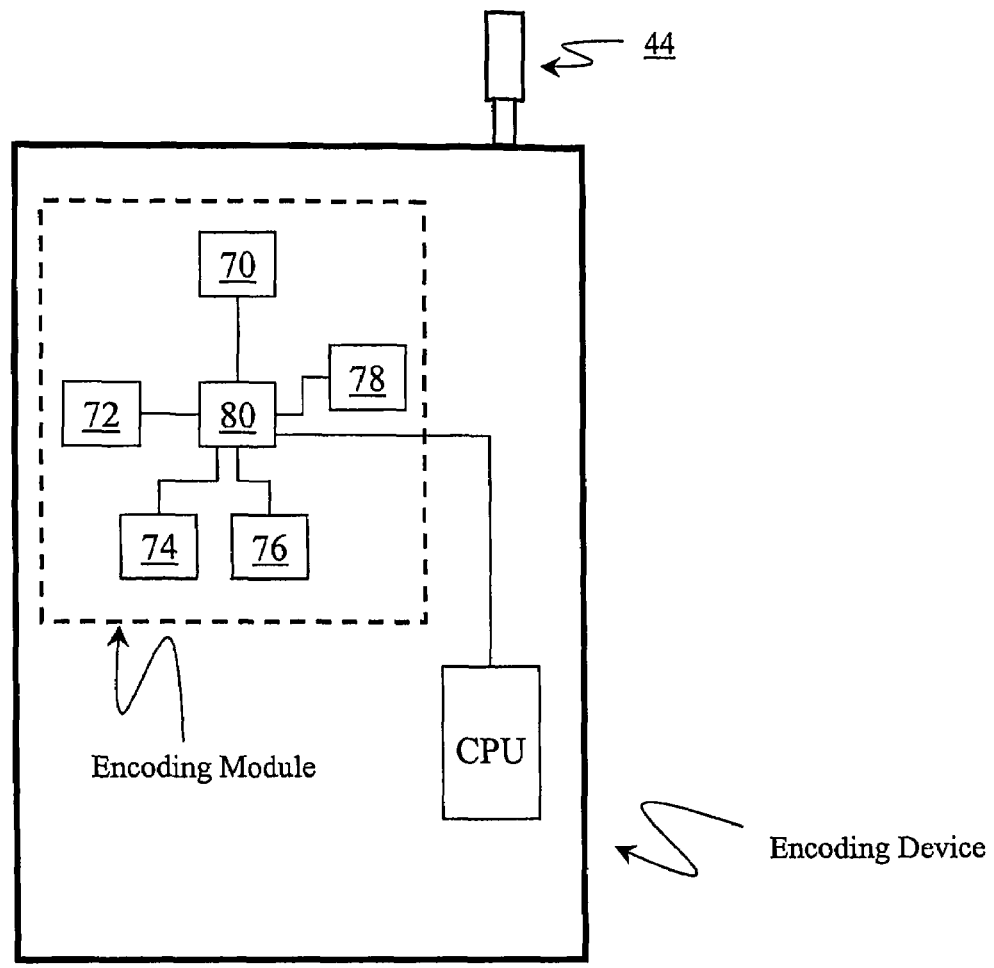
Fig. 7 (Encoding Module)

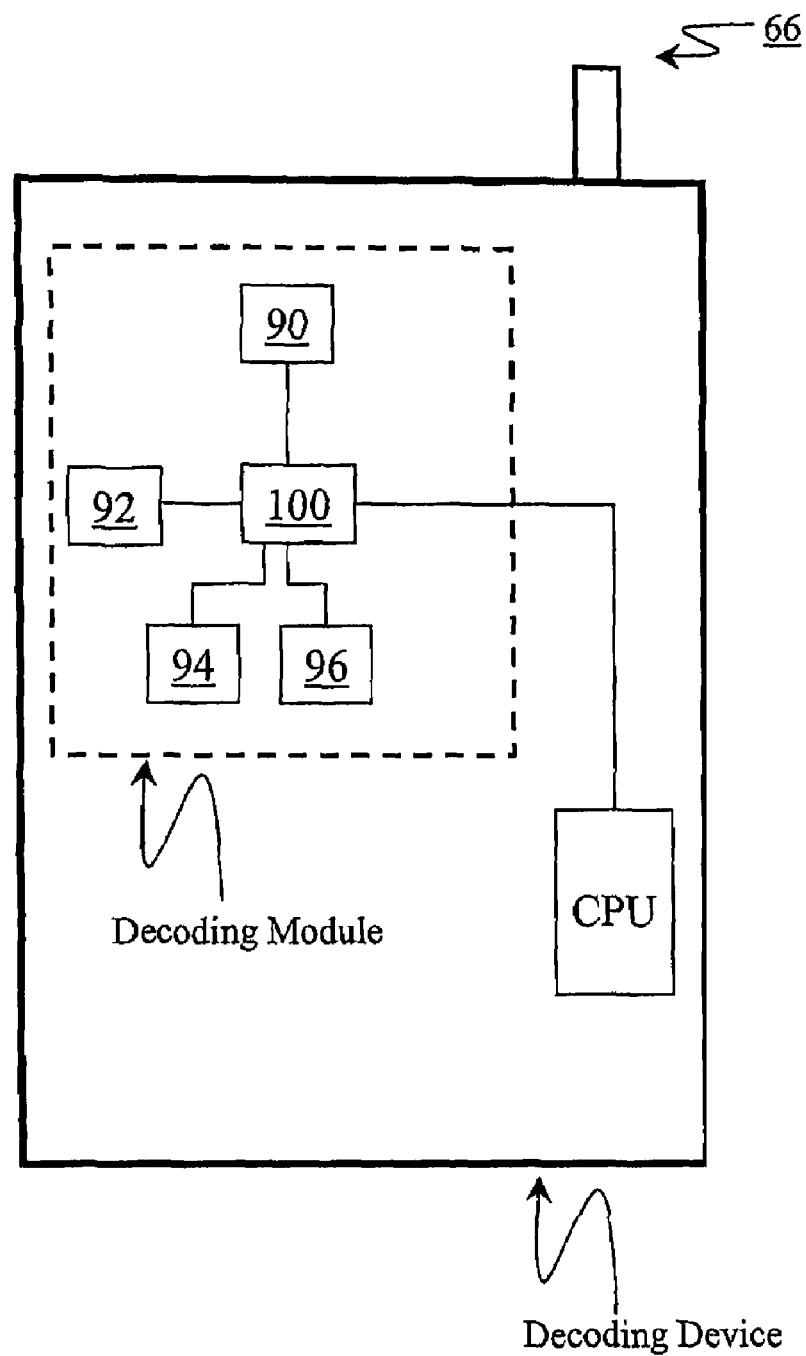
Fig. 8 (Decoding Module)

METHOD AND DEVICE OF FRAME NUMBER ENCODING FOR SYNCHRONIZATION OF ELECTRONIC DEVICES

FIELD OF THE INVENTION

The present invention relates to the field of representation of frame numbers used for synchronization purposes between electronic devices and in particular to methods, modules and devices for coding or encoding such frame numbers in an effective manner.

BACKGROUND

Radio frame numbers or frame numbers, respectively are usually used in digital cellular systems for implementing and managing the synchronization or signaling between terminals and base stations. The prior art proposes a huge number of encoding methods used by various systems. Generally, for signaling purposes a lot of information needs to be transmitted between network (base station) and the terminals. Synchronization generally means that the mobile station detects (i.e. temporally correctly records) a frame structure, which is specified in the base station by a data-structuring rule, of the transmitted data stream in the received radio signal. Thereby the mobile station has to be enabled to decode the corresponding received radio frame structures.

For that, WCDMA uses several physical layer control channels needed for system operation but not necessarily visible for higher level operations. The following paragraphs shortly mention the physical channels used for system operations between terminals and mobile stations.

The Common Pilot Channel (CPICH) is an unmodulated code channel, which is scrambled with a cell-specific primary scrambling code and it is generally used for channel estimation. Another important physical channel is the Synchronization Channel (SCH) mainly needed for cell search. It consists of two channels, a primary and a secondary channel. Once the terminal has identified the secondary SCH-channel, it has obtained frame and slot configuration as well and also main cell information. For this purposes a unique system frame number (SFN) may be needed. For the sake of completeness the remaining channels with their corresponding abbreviations are listed below: Primary Common Control Physical Channel (Primary CCPCH), Secondary CCPCH, Random Access Channel (RACH) for signaling transmission, Acquisition Indicator Channel (AICH), Paging Indicator Channel (PICH) and physical channels for CPCH access procedure. Their functionality is for a skilled person in the telecommunication field clear and it is out of scope of the present invention.

The channels mentioned above are designed for bidirectional transmission of data between base station and user equipment (terminal). They use a 10 ms radio frame structure wherein 72 grouped frames form a super frame of 720 ms. Each frame consists of a system frame number used by several procedures that span more than one frame. Some physical layer procedures may require longer frame periods than 10 ms for correct definition. The radio frame number in WCDMA is very short and its purpose is to provide the radio link level synchronization information only. The encryption of radio frames requires using an extended virtual frame number, which is initialized at the start of a call with a separate and rather complicated method, which is not based on broadcasting the frame number, but on the virtual frame number establishment for each call. The present frame number in WCDMA is 7 bits long and it is used to enumerate 72 frames, which is needed in low-level synchronization.

The synchronization blocks in GSM contain the full frame number (FN), but the radio capacity use has been minimized so that the SCH channel is transmitted relatively infrequently. This makes the synchronization to the base stations very slow, especially in adjacent cell monitoring during a call. Both sides, mobile station and base station use internal counters for synchronization issues. Once the mobile station receives the FN it is able to actualize the entire internal counters so that a synchronic communication to the base station is provided. The radio capacity consumption increases if a larger frame number is needed.

SUMMARY

One of the primary needs for a unique and reliable frame number with a long period is ciphering. For security reasons the length of the ciphering counter is in the range of $2^{32}$. The ciphering counter on the mobile station side must be synchronized with the counter on the base station side. The present invention may be used to ensure ciphering counter synchronization between mobile station and base station. Each radio frame should be encrypted (ciphered) with different parameters and the radio frame number may be used for this issue, as it is unique for each radio frame and it is known at both ends of the radio link. There are conflicting requirements for the length of the radio frame number. As it is repeatedly broadcast in every radio frame, it is beneficial to have the frame number as short as possible to minimize the use of the radio capacity. On the other hand, it is important to have the frame number as long as possible to enable adequate security level in the radio frame encryption.

It is now invented a new frame number encoding method. It enables broadcasting the full system frame number without significantly increasing the use of the radio capacity. Further, the present invention allows broadcasting of the full system frame number without causing unnecessary radio interference.

Furthermore a mobile device able to decode an encoded frame number in accordance with the present invention is provided. Said device may include means for executing the encoding method. Said means may consist of an ASIC, DSP or another means adapted to execute program code. Said encoded frame number results from a base station, which is part of a mobile communication network. The base station comprises means for encoding similar to the mobile station. Both devices are provided with antennas and also modules for sending/receiving signals over a wireless network. Said signals may comprise information like the encoded frame number.

A skilled reader may be able to design a system comprising a plurality of base stations and a plurality of mobile devices, wherein both parties use the encoding or decoding methods, respectively for synchronization or ciphering purposes.

In the following a $2^x$ symbol is used to define a bit position in a binary representation of a frame number, where x is an arbitrary integer value less than N (number of bits used for representing). This is, the LSB bit corresponds to the $2^0$ bit position in a binary represented number and the MSB bit corresponds to the $2^{N-1}$ bit position, where N is the number of bits used for representing. The other bit positions of the binary represented number are analogous defined. For instance $4_{10}=100$ (binary) and the binary 1-value in the binary representation corresponds to the $2^2$ bit position.

The objects of the present invention are solved by the subject matter defined in the accompanying independent claims.

According to a first aspect of the present invention, a method for encoding an original frame number for synchronization of communication between electronic devices resulting in an encoded compact frame number is provided. Said original frame number is provided in a binary representation by a number of ofn bits and said encoded compact frame number by a number of cfn bits. Firstly said original frame number comprises a first group of cfn−k bits and a second group of bits. Next, an index i on the basis of said first group of cfn−k bits of said original frame number is defined. After that the extracting of at least one sliding bit from said second group of bits of said original frame number in accordance with said index i follows. Based on the previously obtained information a forming of said encoded compact frame number follows. By composing of said at least one extracted sliding bit and said first group of cfn−k bits an encoded frame number is obtained and may be provided.

According to an embodiment of the present invention said k is an integer value and 0<k<ofn. Therefore more than one sliding bit may be used for encoding. The maximum number of sliding bits shall not exceed the number of bits of the binary representation of the original frame number.

According to another embodiment of the present invention, said first group of cfn−k bits and said second group of bits are consecutive bits. According to the present embodiment consecutive bits are used which enables a simple encoding process. Each bit value or group of bits is easy to address that simplifies the further implementation.

According to another embodiment of the present invention, said method further comprises sending of said encoded frame number, and repetitive executing said method, wherein said original frame number is varied. Due to the step of sending of said encoded frame number a usage in electronic devices is possible. By repetitive executing of said method a periodical encoding process may be started. This enables a continuous refreshment of said provided original frame number which is encoded in accordance with the present invention.

According to another embodiment of the present invention, said encoded compact frame number is represented by said first group of cfn−k bits of said binary represented original frame number if a overflow of said index i is detected. This step is useful if an overflow is detected. That is, only a first group of cfn−k bits is used for encoding, thus less radio capacity is needed.

According to another embodiment of the present invention, said overflow occurs if the condition specified by i<((ofn−cfn)−k) is false for said index i. The usage of this condition enables a proper detection of said overflow on the decoder side. No additional information or bit may be provided to the encoded frame number for signaling said overflow.

According to another embodiment of the present invention, said index is binary represented by said first group of cfn−k bits of said original frame number. Thus, a simple implementation is guaranteed.

According to another embodiment of the present invention, said position of said at least one sliding bit is relative to a $2^{cfn-k}$ bit position in said binary represented original frame number. Thus, an index overflow is easy to detect and additionally the implementation is clear.

According to a second aspect of the present invention a method for decoding a encoded compact frame number for synchronization of communication between electronic devices resulting in a decoded frame number is provided, wherein said encoded compact frame number is provided in a binary representation by a number of cfn bits and said decoded frame number by a number of cfn bits. Firstly, providing said encoded compact frame number is done. Said providing may correspond to receiving of said encoded frame number for instance by an electronic device or similar. After that determining an index value i by determining a first group of cfn−k bits of said encoded compact frame number follows, wherein said index value i represents a sliding index. In accordance with said index value, extracting at least one sliding bit from a second group of bits of said encoded compact frame number is provided. Finally, deriving said decoded frame number by assigning said first group of cfn−k bits to said decoded frame number in accordance with predefined bit indices defining a first group of bits of said decoded frame number and by including said at least one sliding bit into said decoded frame number within a second group of bits in accordance with said sliding index is provided.

According to an embodiment of the present invention said k is an integer value and 0<k<ofn. Thus, the usage of more then one sliding bit for decoding is possible.

According to another embodiment of the present invention, said providing is done by receiving of said encoded frame number from a sender. This step allows usage of said method in a wireless system comprising a sender and a receiver.

According to another embodiment of the present invention, said index is binary represented by said first group of cfn−k bits of said encoded frame number. This step is necessary for the further encoding process.

According to another embodiment of the present invention, said method further comprises detecting an index overflow if the condition specified by i<((ofn−cfn)−k) for said index i is false. This step is made in accordance with the encoding method and it enables consequent and identical overflow detection on both sides.

According to another embodiment of the present invention, said forming is executed by assigning said first group of cfn−k bits into said decoded frame number in accordance with predefined bit indices if said index overflow is detected. Thus, if a overflow is detected only the group of cfn−k bits is used for decoding. The bit indices defining the assigning position depend of the implementation of the decoding method.

According to another embodiment of the present invention, said method further comprises receiving said encoded frame number and accumulating said decoded frame number. By accumulating the received frame number it is possible to obtain a full frame number after receiving of several encoded frames.

According to a fifth aspect of the present invention, a computer program product is provided, which comprises program code sections stored on a machine-readable medium for carrying out the steps of the method according to any aforementioned embodiment of the invention, when the computer program product is run on a processor-based device, a computer, a terminal, a network device, a mobile terminal, or a mobile communication enabled terminal.

According to a sixth aspect of the present invention, a computer program product is provided, said product comprising program code sections for carrying out the steps of anyone of the method according to any aforementioned embodiment of the invention, when said program is run on a processor-based device, a terminal device, a network device, a portable terminal, a consumer electronic device, or a mobile communication enabled terminal.

According to a seventh aspect of the present invention, a software tool is provided. The software tool comprises program portions for carrying out the operations of the aforementioned methods when the software tool is implemented in a computer program and/or executed.

According to an eighth aspect of the present invention, a computer data signal embodied in a carrier wave and representing instructions is provided which when executed by a processor causes the steps of the method according to an aforementioned embodiment of the invention to be carried out.

According to a further aspect of the present invention a module for encoding an original frame number for synchronization of communication between electronic devices resulting in an encoded compact frame number, wherein said original frame number is binary represented by a number of f bits and said encoded compact frame number by a number of cfn bits, is provided, said module comprises:

- a generator for providing said original frame number, wherein said original frame number comprises a first group of cfn–k bits and a second group of bits;
- an indicator for defining an index i on the basis of said first group of cfn–k bits of said original frame number;
- a extractor for extracting at least one sliding bit from said second group of bits of said original frame number in accordance with said index i;
- a composer for forming said encoded compact frame number by composing said at least one extracted sliding bit and said (primary) said first group of cfn–k bits; and
- a sender for sending said encoded frame number.

According to a further aspect of the present invention a module for decoding a encoded compact frame number for synchronization of communication between electronic devices resulting in a decoded frame number is provided, wherein said encoded compact frame number is binary represented by a number of cfn bits and said decoded frame number by a number of ofn bits, said module comprises:

- a receiver for providing said encoded compact frame number;
- calculating means adapted for determining a index value i by determining a first group of cfn–k bits of said encoded compact frame number, wherein said index value i represents a sliding index;
- a extractor for extracting at least one sliding bit from said encoded compact frame number; and
- means for deriving said decoded frame number by assigning said first group of cfn–k bits into said decoded frame number in accordance with predefined bit indices defining a first group of bits of said decoded frame number and by including said at least one sliding bit into said decoded frame number within a second group of bits in accordance with said sliding index.

According to a further aspect of the present invention a device enabled for encoding an original frame number for synchronization of communication between electronic devices resulting in an encoded compact frame number, comprising at least a module for encoding an original frame number resulting in an encoded compact frame number, wherein said original frame number is binary represented by a number of ofn bits and said encoded compact frame number by a number of cfn bits is provided, said device comprises:

- a generator for providing said original frame number;
- an indicator for defining an index i on the basis of a first group of cfn–k bits of said original frame number;
- a extractor for extracting at least one sliding bit from a second group of bits of said original frame number in accordance with said index i;
- a composer for forming said encoded compact frame number by composing said at least one extracted sliding bit and said (primary) said first group of cfn–k bits; and
- a sender for sending said encoded frame number.

According to a further aspect of the present invention a device enabled for decoding a encoded compact frame number for synchronization of communication between electronic devices resulting in a decoded frame number, comprising at least a module for decoding a encoded compact frame number resulting in a decoded frame number, wherein said encoded compact frame number is binary represented by a number of cfn bits and said decoded frame number by a number of ofn bits, said device comprising:

- a receiver for providing said encoded compact frame number;
- calculating means adapted for determining a index value i by determining a first group of cfn–k bits of said encoded compact frame number, wherein said index value i represents a sliding index;
- an extractor for extracting at least one sliding bit from said encoded compact frame number; and
- means for deriving said decoded frame number by assigning said primary cfn–k bits into said decoded frame number in accordance with predefined bit indices and by including said at least one sliding bit into said decoded frame number within a second group of bits in accordance with said sliding index.

Advantages of the present invention will become apparent to the reader of the present invention when reading the detailed description referring to embodiments of the present invention, based on which the inventive concept is easily understandable.

BRIEF DESCRIPTION OF THE DRAWINGS

The accompanying drawings are included to provide a further understanding of the invention, and are incorporated in and constitute a part of this specification. The drawings illustrate embodiments of the present invention and together with the description serve to explain the principles of the invention. In the drawings, FIG. 1 shows the encoding principle of an original frame number;

FIG. 2 is a block diagram of the encoding principle;

FIG. 3 illustrates the decoding principle in accordance with the present invention; and FIG. 4 is a block diagram of the decoding method;

FIG. 5 shows an embodiment of an encoding device,

FIG. 6 depicts a decoding device in accordance with the present invention;

FIG. 7 illustrates an encoding module embedded in a mobile device in accordance with the present invention and FIG. 8 shows a decoding module in accordance with the present invention.

DETAILED DESCRIPTION OF EMBODIMENTS OF THE INVENTION

Reference will be made in detail to the embodiments of the invention examples, which are illustrated in the accompanying drawings. Wherever possible the same reference numbers are used throughout drawings and description to refer to similar or like parts. The following description relates to various embodiments based on which the skilled reader will understand the principle inventive concept of the present invention. Nevertheless, the skilled reader will appreciate that the inventive concept is likewise applicable to further embodiments, which are covered by the scope of the accompanying claims.

FIG. 1 shows the encoding principle of the present invention for an exemplarily embodiment of the present invention, wherein k is 1 which corresponds to a single sliding bit. The original frame number may contain of a number of ofn bits and it may be divided in two groups of bits. The first group of bits is on the right side of the frame number with reference to FIG. 1 and the left side is representing the other group. The second group of bits is located in the Most Significant Bit (MSB) area and the first group may be located in the Least Significant Bit (LSB) area. Said original frame number according to FIG. 1 depicts a usual number in binary mode and the squares are acting as the bits used for the binary representation of said number. In this exemplarily embodiment a number of ofn squares are used and the LSB area comprises i.e. cfn bits. Above the binary represented frame number the ordering of some individual bits may be found. For instance the first bit in the LSB area possesses the $2^0$ bit position and the MSB bit in the MSB area is at the $2^{ofn-1}$ bit position.

Only bits on the LSB area are provided with exemplarily values. The other squares representing bit values as well may be provided with any other bit values. The encoding method in accordance with the present invention uses firstly only bits of the first group located in the LSB area.

In this exemplarily embodiment of the present invention only the first 5 bits belonging to the first group of bits in the LSB area are used. Those 5 bits represent an index i with reference to FIG. 1. The bit combination 110001 corresponds to a decimal 17. According to the inventive step of the present invention said index i is used to point on a sliding bit included in the MSB area of said original frame number. Said index points to the bit position $2^{i}*2^{cfn-1}$ that is graphically shown in FIG. 1.

In this embodiment the index i is to be relatively seen to the $2^{cfn-1}$ bit position but it is not restricted to this. In this case the sliding bit follows 17 bits after the bit which is located at the $2^{cfn-1}$ bit position.

The next step of the encoding principle is to assemble said sliding bit together with the first cfn-1 bits in the LSB area. The resulting frame comprises in this embodiment only cfn bits wherein the first group of bits remains unchanged and it consists of information regarding to the initial position of the sliding bit in said original frame number.

At least an encoded frame number is provided consisting of cfn bits, wherein the MSN bit of the encoded frame is said sliding bit and the other bits correspond to the LSB area of the original frame number. With reference to FIG. 1 only 5 bits were exemplarily used for indexing. Other bit combinations or number of bits for determining the index may be applied within the scope of the present invention. The encoded frame number comprises information about the position of the sliding bit in the original frame number and also the LSB area (i.e. cfn-1) bits of the original frame number. Thus, less information representing the original frame number is needed and with that less radio capacity for sending the encoded frame number is required.

The core of the method in accordance with the present invention is based on encoding, where the higher order bits are not sent in every synchronization block, but only a single bit of it is put on the top of the lower order bits, which are transmitted in every frame. The lower order bits tell which one of the higher order bits is in question.

According to FIG. 2 an operation sequence block diagram enabling the generation of an encoded frame number according to embodiments of the present invention is depicted. This method may be provided in a base station of a wireless network for synchronization issues. The base station generates a frame number and subsequently executes encoding of said frame number. After encoding the base station is able to send said encoded frame number to a plurality of mobile terminals (UE).

FIG. 2 shows a block diagram of the encoding process of the present invention. In an operation S100, the operational sequence starts. In accordance with the aforementioned description of the inventive concept, an original frame number is provided in an operation S102, which may be binary represented using a number of ofn bits. As aforementioned the number of bits may vary in accordance with the platform using the encoding method.

The next operation S104 symbolizes the identification of the index i that points on the sliding bit of the binary represented original frame number, with reference to FIG. 1. The identification of said index is based on a number of bits in the LSB area of the frame number. The index addresses possible sliding bits in the MSB area. Due to the given binary number representation the index shall not surpass the given range, thus a proper condition for detecting an overflow of said index is needed. Said overflow detection corresponds to the condition i<((ofn−cfn)−1) according to an operation S106. Said condition checks if the index i corresponds to a bit position that locates in the MSB area of said frame number.

If said condition is false only cfn−1 bits from the LSB area will be used for encoding according to the operation S110. That is in this particular case only cfn−1 of the original frame number will represent the encoded frame number. This condition is to be detected on the decoder side.

If said condition is true representing the YES branch an operation for determining the sliding bit in accordance with the previously calculated index follow. By assembling said sliding bit and the other cfn−1 bits of the LSB area of the original frame number an encoded frame number is formed in accordance to an operation S112.

If no further processing is carried out the method comes to an end at step S114

For instance, the present frame number in WCDMA is 7 bits long and it is used to enumerate 72 frames, which is needed in low-level synchronization. If one more bit were added to the frame number making it 8 bits long, with the proposed method, the effective frame number could be up to 135 bits long, which would be sufficient for encryption without any additional signaling in the call set-up.

FIG. 3 depicts the principle of the decoding process of a encoded frame number in accordance with the present invention. Exemplarily two encoded frames with their corresponding decoded frame 1 and 2 are shown. Starting with frame 1 an encoded frame number comprising cfn bits is provided. Said encoded frame number comprises a sliding bit that may be positioned on the top of the encoded frame number. In the present case said sliding bit represents also the most significant bit of the encoded frame number. The remaining group of bits corresponds to the lower bit area of an original frame number, with reference to FIG. 1. Presently, an index i representing the position of said sliding bit is shown with reference to FIG. 1. For instance 5 bits were used but another grouping or number of bits is imaginable within the scope of the present invention. An index $i_1$ is depicted to clarify the encoded frame in question. Below the first encoded frame number a full frame number is depicted which already consists of the first group of bits in accordance with the encoded frame number. The values of the first cfn−1 bits respectively are simply assigned to the corresponding bits in said decoded frame number. Next said sliding bit has to be included in frame 1 representing the encoded frame number. As shown the position of said sliding bit is on basis of said index $i_1$. The corresponding bit position of said sliding bit in said encoded frame number is mathematically underlined by the expression $2^{i_1[ma2]} * 2^{cfn-1}$, which means that the new position is relative to the $2^{cfn-1}$ position. As a result an encoded frame number is obtained comprising the lower bit area of said original frame number and said sliding bit value located at the correct position.

In the next step a second encoded frame number is received. The steps described above explaining the assigning of the lower bit area and the positioning of the actual sliding bit as well are similar with reference to the decoding of frame 1. An important issue is that the previously encoded sliding bit is accumulated. Presently, the position of the actual sliding bit corresponding to the second index $i_{2[ma3]}$ is underlined by a white arrow. The black filled arrow points on the accumulated sliding bit.

The fact is that several encoded frame number must be received before the full frame number can be decoded. The number of the received encoded frame number depends on the implementation, precisely on the number of bits used for indexing.

With reference to FIG. 4, a generalized embodiment of the decoding process of the present invention is illustrated.

In an operation S200, the operational sequence starts. In accordance with the aforementioned description of the inventive concept, an encoded frame number is obtained in an operation S202. Said encoded frame numbers consist of a number of cfn bits, wherein a sliding bit corresponding to a bit position of said original frame number is provided.

In an operation S204 an index describing the original position of said sliding bit is determined. The binary representation of said index may comprise the first cfn−1 bits in said binary represented frame number. Other implementations enabled to calculate said index i are imaginable within the scope of the present invention. In a decisional operation S206 an index overflow of the index i is to be detected. Said overflow is signalized by the encoding process as well. If an index overflow was detected that corresponds to the NO branch only the group of cfn−1 bits are used for decoding. That is, just said group of cfn−1 bits in the encoded frame number are assigned and in a next operation S220 an accumulation step is done. Said accumulation step S220 may be provided because several encoded frame numbers are needed for a complete decoding process.

On the other said if no index overflow is detected according to the YES branch an operation S208 follows. S208 is representing the extraction of said sliding bit from the encoded frame number. Next an operation S 212 for forming the encoded frame number in accordance with the previously received or decode information is provided. That is, on basis of said index i said sliding bit is positioned in the encoded frame number and the lower bit area (first cfn−1 bits) is assigned as well in accordance with the received encoded frame number.

After forming of said decoded frame number said accumulative operation S220 follows and if no further processing is carried out the method comes to an end at step S214

The implementation of the logic diagrams shown in FIGS. 2 and 4 in form of an integrated circuit, an ASIC, a DSP, a FPGA or as a program comprising code sections for performing the illustrated logic rules is part of the knowledge of those skilled in the specific art.

FIG. 5 shows a possible embodiment of an encoding device in accordance with the present invention. The device may be a base station of a wireless network used for managing a certain number of mobile devices, like mobile phones or similar. As aforementioned the encoding device has to generate a frame number that can be used for ciphering or synchronization of the communication of the wireless communication between mobile device and base station.

The encoding device comprises at least one CPU which is assigned to control all entities included in said encoding device. A generator 35 connected with the CPU is designed for providing a frame number that is further used for synchronization issues, for instance. The indicator 37 connected with the CPU as well is adapted to define an index i on the basis of the frame number generated by the generator 35. The CPU triggers by means of a clock or similar means the generator 35 to provide the original frame number.

An extractor 36 in connection with the CPU as well receives the value i, which was previously generated by the indicator 37, for extracting at least one sliding bit from a second group of bits of the frame number.

A composer 38 in connection with the CPU forms an encoded frame number by composing said sliding bit and the first group of bits of the original frame number. Subsequently the encoded frame number is provided by means of the CPU to a sender 34 which is connected to an antenna 44. The sender may comprise a receiving module as well which allows a bidirectional communication between base station (encoding device) and a mobile device, for instance.

Additionally, the encoding device is equipped with a memory 39 which may serve as a central memory unit for storing different data. The memory 39 communicates with the CPU and it provides data for all comprised modules. Said memory 39 may be a Random Access Memory (RAM) module, a flash memory module, a Read Only Memory module or the like. One main difference between RAM and the other above-mentioned memory types is that a RAM module has to be refreshed. Said refreshing may be provided either by said CPU or by means of a memory controller (not depicted), for instance.

Generally, the operation of the device can be carried out on a software basis as well. Said software is loaded into said memory 39, thus a convenient operating of said device is ensured. By means of software programs different behaviors of said device are conceivable. For example, it is possible to upload a new, actual firmware into the device to add special functions, like for instance an encoding/decoding operation in accordance with the present invention.

However, the methodology in accordance with this exemplarily embodiment of the present invention can be carried out by using a combination of proper software, firmware or hardware means.

FIG. 6 illustrates an embodiment of a decoding device in accordance with the present invention. It may represent a cellular phone or another mobile device, adapted to communicate with a base station or an encoding device respectively.

The entire operations in the encoding device are controlled by a CPU (central processing unit) that is in bidirectional communication with all other modules or devices, which are part of the encoding device. For storing issues a memory 59 is provided in said device. The memory 59 is connected with the CPU as well and it is also controlled by said CPU. The other entities included in the decoding device communicate with the memory 59 via the CPU.

Calculating means 53 adapted for determining an index value i by determining a first group of cfn−k bits of said encoded compact frame number is comprised in said device as well. The calculating means 53 uses the information received by a receiver 54, which is connected with a antenna 66 for receiving a encoded frame number. Additionally the receiver 54 may comprise a sender as well so that the mobile device is able to send information to a base station or to a similar device.

Means for deriving 55 a decoded frame number that was previously received by the receiver are connected with the CPU to provide the decoded frame number for further usage. The CPU, for instance is now able to provide synchronization operations on the basis of the decoded frame number and it may redirect the number to be stored in the memory module 56$_{[ma5]}$.

FIG. 7 shows an encoding module for encoding an original frame number for synchronization of communication between electronic devices in accordance with the present invention. Said module may be embedded in an above-mentioned mobile device.

The encoding module comprises means for controlling 80, wherein said means are connected with the CPU of said mobile device. Said means for controlling 80 may also be used to operate the other modules within said encoding module. In this exemplary embodiment said module comprises a generator 70 for providing said original frame number, an indicator 72 for defining an index i, an extractor 74 for extracting at least one sliding bit, a composer 76 for forming said encoded compact frame and a sender 70 for sending said encoded frame number, wherein all of them are in connection with said means for controlling 80.

Said means for controlling 80 can act as a software interface, thus all controlling is maintained by the CPU, which is part of said mobile device. However, said module for encoding is adapted to process the encoding method in accordance with the present invention.

FIG. 8 illustrates a decoding module in accordance with the present invention. Said module is similarly embedded into the mobile device and can be provided as executable software code, for instance. Also imaginable is that said module is stored on a flash card, memory means or the like, as well as the previously mentioned encoding module. Controlling means 100 are used to control the module functionality and also to interconnect the decoding device CPU.

Said encoding module comprises a receiver 90 for providing an encoded compact frame number, calculating means 92 adapted for determining an index value i according to the present invention, an extractor 94 for extracting at least one sliding bit and means for deriving 96 a decoded frame number, all of them interconnected by means of the controlling means 100.

Further, said encoding module and said decoding module may be a part of one device and the operation of both modules is provided by the device CPU.

In the previously described embodiments of the present invention only a single sliding bit is used for encoding or decoding respectively, therefore a skilled reader may modify the implementation mentioned above for using two or more sliding bits. If two sliding bits are used, for instance, the index formed by the LSB's (first group of bits) is just multiplied by two to determine the correct position of the two sliding bits. Three, four or more bits are handled with the same principle.

Even though the invention is described above with reference to embodiments according to the accompanying drawings, it is clear that the invention is not restricted thereto but it can be modified in several ways within the scope of the appended claims.

The invention claimed is:

1. A method for forming an encoded compact frame number (cfn), comprising:

providing an original frame number (ofn) to an encoder, wherein said original frame number in binary representation comprises a number of ofn bits including a first group of bits (cfn−k), wherein k is an integer value, and a second group of bits;

defining an index (i) on the basis of said first group of cfn−k bits of said original frame number;

extracting at least one sliding bit from said second group of bits of said original frame number in accordance with said index; and forming said encoded compact frame number by composing said at least one extracted sliding bit and said first group of cfn−k bits.

2. Method according to claim 1, wherein k satisfies 0<k<ofn.

3. Method according to claim 1, wherein said first group of cfn−k bits and said second group of bits are consecutive bits.

4. Method according to claim 1, further comprising sending the encoded compact frame number, and repetitively executing said method including the sending, wherein said original frame number is varied.

5. Method according to claim 1, wherein said encoded compact frame number is represented by said first group of cfn−k bits of said binary represented original frame number if an overflow of said index is detected.

6. Method according to claim 5, wherein said overflow occurs if the condition specified by i<((ofn−cfn)−k) is false for said index i.

7. Method according to claim 1, wherein said index is binary represented by said first group of cfn−k bits of said original frame number.

8. Method according to claim 1, wherein said sliding bit has a position relative to a $2^{cfn-k}$ bit position in said binary represented original frame number.

9. Method according to claim 8, wherein k satisfies 0<k<ofn.

10. Computer program product, comprising program code sections stored on a non-transitory machine-readable medium for carrying out the steps of claim 1, when said computer program product is run on a processor-based device, a terminal device, a network device, a portable terminal, a consumer electronic device, or a mobile communication enabled terminal.

11. A method for deriving a decoded frame number (ofn), comprising:

providing an encoded compact frame number (cfn) to a decoder, wherein said encoded compact frame number is binary represented by a number of cfn bits;

determining an index value (i) by determining a first group of bits (cfn−k), wherein k is an integer value, of said encoded compact frame number, wherein said index value i represents a sliding index;

extracting at least one sliding bit from a second group of bits of said encoded compact frame number; and deriving said decoded frame number by assigning said first group of cfn−k bits to said decoded frame number in accordance with predefined bit indices defining a first group of bits of said decoded frame number and by including said at least one sliding bit into said decoded frame number within a second group of bits in accordance with said sliding index.

12. Method according to claim 11, wherein said providing is done by receiving of said said at least one sliding number from a sender.

13. Method according to claim 11, wherein said index value i is binary represented by said first group of cfn−k bits of said encoded frame number.

14. Method according to claim 11, further comprising detecting a index overflow if the condition specified by i<((ofn−cfn)−k) for said index value i is false.

15. Method according to claim 14, wherein said deriving is executed by assigning said first group of cfn−k bits into said decoded frame number in accordance with predefined bit indices if said index overflow is detected.

16. Method according to claim 11, further comprising receiving said encoded compact frame number and accumulating said decoded frame number.

17. Method according to claim 11, wherein k satisfies 0<k<ofn.

18. Module for forming an encoded compact frame number (cfn), comprising:
- a generator circuit for providing an original frame number (ofn), wherein said original frame number in binary representation comprises a number of ofn bits including a first group of bits (cfn−k), wherein k is an integer value, and a second group of bits;
- an indicator circuit for defining an index (i) on the basis of said first group of cfn−k bits of said original frame number;
- an extractor circuit for extracting at least one sliding bit from said second group of bits of said original frame number in accordance with said index;
- a composer circuit for forming said encoded compact frame number by composing said at least one extracted sliding bit and said first group of cfn−k bits; and
- a sender circuit for sending said encoded compact frame number.

19. Module for deriving a decoded frame number (ofn), comprising:
- a receiver circuit for providing an encoded compact frame number (cfn), wherein said encoded compact frame number is binary represented by a number of cfn bits;
- a processor configured to determine an index value (i) by determining a first group of bits (cfn−k), wherein k is an integer value, of said encoded compact frame number, wherein said index value i represents a sliding index;
- an extractor circuit for extracting at least one sliding bit from said encoded compact frame number; and
- the processor is further configured to derive said decoded frame number by assigning said first group of cfn−k bits to said decoded frame number in accordance with predefined bit indices defining a first group of bits of said decoded frame number and by including said at least one sliding bit into said decoded frame number within a second group of bits in accordance with said sliding index.

20. A device comprising:
- at least one processor; and
- at least one memory including computer program code, the at least one memory and the computer program code configured to, with the at least one processor, cause the device at least to
- provide an original frame number (ofn), wherein the original frame number in binary representation comprises a number of ofn bits including a first group of bits (cfn−k), wherein k is an integer value, and a second group of bits;
- define an index (i) on the basis of the first group of cfn−k bits of said original frame number;
- extract at least one sliding bit from the second group of bits of said original frame number in accordance with said index i;
- form an encoded compact frame number (cfn) by composing said at least one extracted sliding bit and said first group of cfn−k bits; and
- send said encoded compact frame number.

21. A device comprising:
- at least one processor; and
- at least one memory including computer program code, the at least one memory and the computer program code configured to, with the at least one processor, cause the device at least to
- receive an encoded compact frame number (cfn), wherein said encoded compact frame number is binary represented by a number of cfn bits;
- determine an index value (i) by determining a first group of bits (cfn−k), wherein k is an integer value, of said encoded compact frame number, wherein said index value i represents a sliding index;
- extract at least one sliding bit from said encoded compact frame number; and
- derive a decoded frame number by assigning said first group of cfn−k bits into said decoded frame number in accordance with predefined bit indices and by including said at least one sliding bit into said decoded frame number within a second group of bits in accordance with said sliding index.

* * * * *

UNITED STATES PATENT AND TRADEMARK OFFICE
CERTIFICATE OF CORRECTION

| | | |
|---|---|---|
| PATENT NO. | : 8,144,701 B2 | Page 1 of 1 |
| APPLICATION NO. | : 11/794504 | |
| DATED | : March 27, 2012 | |
| INVENTOR(S) | : Jukka Ranta | |

It is certified that error appears in the above-identified patent and that said Letters Patent is hereby corrected as shown below:

In the Claims

Column 12, line 32, Claim 8: "said sliding" should read --said at least one sliding--.

Column 12, line 63, Claim 12: "said said at least one sliding" should read --said encoded compact frame--.

Signed and Sealed this
Eighth Day of May, 2012

David J. Kappos
*Director of the United States Patent and Trademark Office*